(12) United States Patent
Heydel

(10) Patent No.: US 12,509,293 B2
(45) Date of Patent: Dec. 30, 2025

(54) BIODEGRADABLE CAPSULE WITH INTEGRATED OPENING MEANS

(71) Applicant: SOCIETE DES PRODUITS NESTLE S.A., Vevey (CH)

(72) Inventor: Christophe Sebastien Paul Heydel, Chez-le-Bart (CH)

(73) Assignee: Societe des Produits Nestle S.A., Vevey (CH)

( * ) Notice: Subject to any disclaimer, the term of this patent is extended or adjusted under 35 U.S.C. 154(b) by 346 days.

(21) Appl. No.: 18/043,459

(22) PCT Filed: Aug. 30, 2021

(86) PCT No.: PCT/EP2021/073843
§ 371 (c)(1),
(2) Date: Feb. 28, 2023

(87) PCT Pub. No.: WO2022/049017
PCT Pub. Date: Mar. 10, 2022

(65) Prior Publication Data
US 2023/0312229 A1    Oct. 5, 2023

(30) Foreign Application Priority Data

Sep. 2, 2020 (EP) ..................................... 20193999

(51) Int. Cl.
*B65D 85/804* (2006.01)
*B65D 65/46* (2006.01)
*D21J 3/10* (2006.01)

(52) U.S. Cl.
CPC ....... *B65D 85/8043* (2013.01); *B65D 65/466* (2013.01); *D21J 3/10* (2013.01)

(58) Field of Classification Search
CPC ....... B65D 85/804–8067; B65D 65/466; D21J 3/10
See application file for complete search history.

(56) References Cited

U.S. PATENT DOCUMENTS 5,472,719 A * 12/1995 Favre ................. B65D 85/8055
426/77
6,792,980 B1 * 9/2004 Cortese ............... A47J 31/3633
141/330
(Continued)

FOREIGN PATENT DOCUMENTS

JP    2018503417 A    2/2018
WO    03059778       7/2003
(Continued)

OTHER PUBLICATIONS

Russian Office Action for Appl No. 2023104659/11 dated Nov. 28, 2024, 7 pages.
(Continued)

*Primary Examiner* — Dariush Seif
(74) *Attorney, Agent, or Firm* — K&L Gates LLP

(57) ABSTRACT

The present invention relates to a capsule (100) for preparing a beverage, which comprises a capsule body (200), which delimits a closed chamber (210) for enclosing a substance for the preparation of the beverage by injecting a fluid into the chamber (210). The capsule body (200) comprises a retaining wall (220) delimiting a part of the chamber (210). The capsule (100) further comprises an opening device (300) for opening the closed chamber (210). Therein, the opening device (300) and the retaining wall (220) are provided with respect to each other such that engagement between the retaining wall (220) and the opening device (300) is performed under the effect of pressure of the injected fluid rising in the closed chamber (210) to open the closed chamber (210). The capsule body (200) with its retaining wall (220) as well as the opening device (300) are all made of a biodegradable material. The invention relates also to a method for constructing and manufacturing the capsule (100).

14 Claims, 2 Drawing Sheets

(56) References Cited

U.S. PATENT DOCUMENTS

| | | | | |
|---|---|---|---|---|
| 9,745,122 B2* | 8/2017 | Dogan | | B65D 85/8043 |
| 10,144,579 B2* | 12/2018 | Perentes | | B65D 85/8049 |
| 11,643,269 B2* | 5/2023 | Cafaro | | B65D 85/8049 |
| | | | | 99/295 |
| 11,827,446 B2* | 11/2023 | Oliver | | A23F 5/262 |
| 2004/0228955 A1* | 11/2004 | Denisart | | B65D 85/8043 |
| | | | | 426/590 |
| 2006/0219098 A1* | 10/2006 | Mandralis | | A47J 31/36 |
| | | | | 99/279 |
| 2008/0216666 A1* | 9/2008 | Doglioni Majer | . | B65D 85/8043 |
| | | | | 222/1 |
| 2008/0317931 A1* | 12/2008 | Mandralis | | A23F 5/24 |
| | | | | 426/594 |
| 2009/0175986 A1* | 7/2009 | Doglioni Majer | . | B65D 85/8061 |
| | | | | 426/77 |
| 2009/0211458 A1* | 8/2009 | Denisart | | B65D 85/8061 |
| | | | | 99/300 |
| 2010/0107889 A1* | 5/2010 | Denisart | | A47J 31/3695 |
| | | | | 99/295 |
| 2010/0180774 A1* | 7/2010 | Kollep | | B65D 85/8049 |
| | | | | 426/77 |
| 2010/0239717 A1* | 9/2010 | Yoakim | | B65D 85/8061 |
| | | | | 426/77 |
| 2010/0313766 A1* | 12/2010 | Suggi Liverani | ... | A47J 31/0673 |
| | | | | 99/295 |
| 2012/0015080 A1* | 1/2012 | Roulin | | A47J 31/407 |
| | | | | 426/106 |
| 2012/0251677 A1* | 10/2012 | Yoakim | | A47J 31/22 |
| | | | | 426/112 |
| 2012/0258221 A1* | 10/2012 | Wong | | A47J 31/368 |
| | | | | 426/431 |
| 2013/0216663 A1* | 8/2013 | Dogan | | B65D 85/8043 |
| | | | | 426/115 |
| 2014/0186498 A1* | 7/2014 | Dogan | | B65D 85/804 |
| | | | | 426/115 |
| 2014/0190863 A1* | 7/2014 | Fabozzi | | B65B 29/022 |
| | | | | 206/524.6 |
| 2014/0373725 A1* | 12/2014 | Mastropasqua | | B65D 77/30 |
| | | | | 426/115 |
| 2015/0059588 A1* | 3/2015 | Castellani | | A47J 31/0668 |
| | | | | 99/295 |
| 2015/0072053 A1* | 3/2015 | Dogan | | B65D 85/8043 |
| | | | | 426/112 |
| 2015/0203285 A1* | 7/2015 | Baldo | | A47J 31/407 |
| | | | | 426/112 |
| 2015/0232263 A1* | 8/2015 | Talon | | B65D 65/38 |
| | | | | 426/115 |
| 2015/0284179 A1* | 10/2015 | Kohli | | B65D 85/8052 |
| | | | | 426/115 |
| 2015/0336736 A1* | 11/2015 | Cabilli | | B65D 65/466 |
| | | | | 264/494 |
| 2016/0107831 A1* | 4/2016 | Talon | | A47J 31/407 |
| | | | | 426/115 |
| 2016/0137402 A1* | 5/2016 | Talon | | A47J 31/407 |
| | | | | 426/115 |
| 2017/0001795 A1* | 1/2017 | Heydel | | B65D 85/8043 |
| 2017/0008694 A1* | 1/2017 | Andreae | | B65D 65/466 |
| 2017/0073153 A1* | 3/2017 | Bartoli | | B65D 85/8061 |
| 2017/0158422 A1 | 6/2017 | Andreae et al. | | |
| 2017/0327308 A1* | 11/2017 | Valsecchi | | B65D 85/8061 |
| 2018/0016092 A1* | 1/2018 | Dogan | | B65D 85/8052 |
| 2018/0093821 A1* | 4/2018 | Cabilli | | B65D 65/466 |
| 2018/0257856 A1* | 9/2018 | Oliver | | B65D 85/8061 |
| 2018/0327178 A1* | 11/2018 | Bartoli | | B65D 85/8061 |
| 2019/0016527 A1* | 1/2019 | Doglioni Majer | . | B65D 85/8052 |
| 2019/0047771 A1* | 2/2019 | Mühlemann | | B65D 85/8049 |
| 2019/0100376 A1* | 4/2019 | Rondelli | | B65D 85/8061 |
| 2019/0119036 A1* | 4/2019 | Nordqvist | | B32B 27/34 |
| 2019/0225413 A1* | 7/2019 | Dogan | | B65D 85/8055 |
| 2019/0300275 A1* | 10/2019 | Faravelli | | B65D 85/8061 |
| 2020/0047984 A1* | 2/2020 | Halliday | | A47J 31/407 |
| 2020/0047985 A1* | 2/2020 | Oliver | | A23F 5/262 |
| 2020/0223621 A1* | 7/2020 | Doglioni Majer | . | B65D 85/8043 |
| 2020/0307901 A1* | 10/2020 | Calsina Gomis | .. | B65D 85/8061 |
| 2021/0261280 A1* | 8/2021 | Krüger | | B65B 51/225 |
| 2022/0009704 A1* | 1/2022 | Dogan | | B65D 85/8052 |
| 2022/0024684 A1* | 1/2022 | Boss | | B65D 85/8043 |
| 2022/0033173 A1* | 2/2022 | Kuo | | B65D 81/2076 |
| 2022/0048701 A1* | 2/2022 | Dogan | | B65D 85/8052 |
| 2022/0135316 A1* | 5/2022 | Nabeiro | | B65D 85/8052 |
| | | | | 426/115 |
| 2022/0258960 A1* | 8/2022 | Dogan | | B65D 85/8067 |
| 2022/0348402 A1* | 11/2022 | Brivois | | B65D 85/8064 |
| 2023/0312229 A1* | 10/2023 | Heydel | | B65D 85/8043 |
| | | | | 426/115 |

FOREIGN PATENT DOCUMENTS

| | | |
|---|---|---|
| WO | 2017063680 A1 | 4/2017 |
| WO | 2017114970 | 7/2017 |
| WO | 2018224174 | 12/2018 |
| WO | 2019145715 A1 | 8/2019 |
| WO | 2020104402 | 5/2020 |
| WO | 2020120432 | 6/2020 |

OTHER PUBLICATIONS

Japanese Office Action for Appl No. 2023-513144 dated Aug. 26, 2025, 3 pages.

* cited by examiner

BIODEGRADABLE CAPSULE WITH INTEGRATED OPENING MEANS

CROSS REFERENCE TO RELATED APPLICATIONS

The present application is a National Stage of International Application No. PCT/EP2021/073843, filed on Aug. 30, 2021, which claims priority to European Patent Application No. 20193999.8, filed on Sep. 2, 2020, the entire contents of which are being incorporated herein by reference.

FIELD OF THE INVENTION

The present invention relates to a capsule for preparing a beverage by injecting a fluid into a closed chamber for containing a substance for the preparation of the beverage. The capsule comprises an opening device for opening the closed chamber under the effect of pressure of the injected fluid rising in the closed chamber. The present invention further relates to a method for constructing and manufacturing the capsule of the invention.

TECHNICAL BACKGROUND

Removable capsules for beverage preparation machines are known in the prior art. These capsules are commonly used for on demand dispensing of beverages, like coffee, tea or hot chocolate but also soups or other savoury dishes. Usually, the capsule contains a beverage component and is inserted in a capsule receiver of a beverage preparation machine. The capsule receiver is closed and the beverage preparation is started. Fluid, such as water or milk, is delivered to the capsule to interact with the beverage component inside the capsule to produce the desired beverage.

In the capsule receiver, the capsule is punctured at one end with a needle to introduce the fluid into the capsule. The pressure inside the capsule is increased until a self-opening mechanism in the capsule is activated at a time when extraction of the beverage component is completed, which then allows the beverage to flow out of the capsule. The so prepared beverage leaves the capsule and is dispensed in a cup. Patent EP 1 472 156 B1 describes examples for working principles of this type of capsule.

Such beverage preparation is convenient as users can simply select a beverage of their liking, place a capsule containing the desired beverage components in a machine and consume the beverage immediately afterwards. However, as the capsules are often designed for single time use only, the disposal of the capsules has to be managed.

Commonly, the capsule itself is made of aluminium since it provides the capsules with the advantages of high pressure resistance, durability, flexibility, low weight, corrosive resistance, long shelf-life and of letting the taste of the prepared beverage unaltered.

Unfortunately, aluminium is difficult to recycle because in many countries systems for recycling aluminium are either not in place, not sufficiently advanced or require the provision of additional waste disposal systems, such as consumer collection stations, which are difficult to establish in practice. Also, the production of aluminium for the capsules consumes a high amount of energy, which leads to an increase in carbon emissions during the production of the capsules.

Moreover, mechanical components inside the capsule, which, for example, provide the functionality of the above-mentioned self-opening mechanism, are made of plastic or metal materials as they require defined pressure resistance, rigidity and must not alter the taste of the beverage. However, as aluminium, such materials are not considered as being ecologically beneficial unless recycled and it is difficult to ensure a viable recycling system.

Therefore, various attempts were made to replace the materials used in and for the capsule with alternative materials.

For example, bioplastics made from corn-starch or dried pulp made from sugarcane fibre were proposed as capsule material. However, a disadvantage of such materials is that they do not have the same material characteristics and advantages as presently used materials, like aluminium or plastics. For example, capsules made from alternative materials often have a limited shelf-life as they do not provide a reliable oxygen and moisture barrier. Also, materials, such as pulp, often do not offer the same mechanical strength and rigidity that is required for providing a self-opening functionality. In the prior art, this problem was addressed by reverting to established materials, like plastic. While these materials offer the mechanical properties required, it is often a necessity that elements of the capsule are supplied as separate parts, which leads to problems in manufacturing and potentially with recycling of the materials. Further, such variety of materials leads to the problem that the so configured capsule also cannot always decompose completely and residues remain at the end of the composting process. For this reason, such blends of materials often are not accepted for industrial composting.

Therefore, it is an object of the present invention to provide a capsule with a design that allows the capsule and each of its components to be made entirely of biodegradable and/or compostable materials but to provide still at least the same if not more functionalities than known from capsules of the prior art. In particular, it is an object of the invention to provide a capsule with a self-opening mechanism that is integrated in the capsule and made of biodegradable and/or compostable materials, thereby simplifying and improving the disposal of a capsule after being used.

These and other objects, which become apparent upon reading the description, are solved by the subject matter of the independent claims. The dependent claims refer to preferred embodiments of the invention.

SUMMARY OF THE INVENTION

A first aspect of the invention relates to a capsule for preparing a beverage. The capsule comprises a capsule body delimiting a closed chamber for enclosing a substance for the preparation of the beverage by injecting a fluid into the chamber. The capsule body comprises a retaining wall delimiting a part of the chamber. The capsule further comprises an opening device for opening the closed chamber. The opening device and the retaining wall are provided with respect to each other such that engagement between the retaining wall and the opening device is performed under the effect of pressure of the injected fluid rising in the closed chamber to open the closed chamber. The capsule body with its retaining wall as well as the opening device are all made of a biodegradable material.

Preferably, the capsule (with the capsule body, the retaining wall and the opening device) is made of an also compostable material.

Therein, the expression "biodegradable material" may be understood as any material that can be broken down into environmentally innocuous products by (the action of) living things (such as microorganisms, e.g. bacteria, fungi or algae). This process could take place in an environment with the presence of oxygen or otherwise without the presence of oxygen. This may be understood, for example, as meaning that composting can be carried out without reservation. In particular, at the end of a composting process, there are no residues of the material that may be problematic for the environment or there are no non-biodegradable components.

Examples for biodegradable materials may be plant-based materials, such as wood, bamboo, bamboo fibres, cellulose, cellulose pulp, bagasse pulp, wood pulp, sugarcane pulp, paper and/or cardboard. In addition also bioplastics such as polyhydroxybutyrate (PHB) and co-polymers, polybutylene succinate (PBS), poly(butylene succinate-co-butylene adipate) (PBS-A/PBSa), polylactide (PLA), polybutylene adipate terephthalate (PBAT), cellulosed acetate and starch, for example.

International standards, such as EU 13432 or US ASTM D6400, specify technical requirements and procedures for determining biodegradability and compostability of a material. For example, one of the tests requires that—in order to be considered as being "industrially compostable"—at least 90% of the material in question is biologically degraded under controlled conditions in 6 months. Similar test schemes also exist for home compostable certification.

Thus, compostable materials can simply be disposed in compost piles, which are designated sites with specific conditions dependent on wind, sunlight, drainage and other factors, whereby the earth can be supplied with nutrients once the material has completely broken down.

The composting can be accomplished with industrial composting sites and/or with home composters or food caddies. For example, according to the aforementioned internationally accepted legal standards, compostable plastic materials must have the following characteristics simultaneously for a material to be defined as compostable. The material must be biodegradable (as described above) and disintegrable, i.e. fragmentation of at least 90%, based on dry weight, into pieces smaller than 2×2 mm, and invisibility in the final compost, and it must not have negative effects on the composting process and quality.

In other words: the present invention provides a capsule for beverage preparation that is (e.g. seen as a whole) entirely made of (at least) biodegradable materials. Inversely, the capsule (and its components) does not contain any element made of a non-biodegradable (non-compostable) material. This allows disposal of the capsule after the beverage preparation in a way that allows for its biocontent being recycled organically in the best way available. The energy consumption in production of the capsule can be reduced and, since biodegradable (and compostable) materials typically are plant-based, the materials have sustainable resources.

Therein, the term "capsule" may be understood as a closed receptacle containing a "substance", which may be any type of (solid, liquid, at least partially soluble and/or percolate-able) matter of a particular or definite chemical constitution. Examples for substances may be roasted ground coffee, instant coffee, tealeaves, syrup concentrate, fruit extract concentrate, a chocolate product, dehydrated edible substances, such as dehydrated stock, biodegradable substances, and/or combinations thereof. Accordingly, examples for beverages that may be prepared with such substances may be coffee- or chocolate-based drinks, soups, broths or other similar types of food.

Commonly, for the preparation of the beverage it may be required to inject a fluid in the capsule. The fluid may be any type of flowing, liquid and/or differently tempered substance. A fluid may be (hot or cold) water or milk in a liquid state.

The capsule comprises a capsule body with a retaining wall, each of which delimits a closed chamber for enclosing a substance for the beverage preparation. Thereby, it is possible to provide the capsule with a compartment in the capsule body that has no access openings and that contains and encapsulates the substance for the beverage preparation. Further, the capsule comprises an opening device for opening the closed chamber. Thereby, it is possible to open the closed chamber at the time of its use and to obtain the prepared beverage from the capsule. In particular, it is possible to open the capsule without the provision of additional components, for example provided on a corresponding capsule machine.

Moreover, the opening device and the retaining wall are provided (and/or configured) with respect to each other such that not only the retaining wall and the opening device can interact (i.e. they may act upon or with each other) with each other under the effect of a fluid rising the pressure in the closed chamber, but are also provided (and/or configured) such that, when a fluid which is injected in the closed chamber for the beverage preparation and the pressure of the fluid rises in the closed chamber, the closed chamber is opened.

Thereby, it is possible to activate the engagement between opening device and retaining wall by the rise of pressure of the fluid introduced into the closed chamber at a defined time. For example, the expression "engagement" may mean that either the opening device or the retaining wall, or alternatively both may be moved with respect to each other to effect opening. Moreover, this configuration further facilitates that the materials used for the opening device and the retaining wall show the mechanical properties required for opening the closed chamber. Thereby, this configuration of the capsule allows using ecologically beneficial materials and overcomes the problem of having to revert to less beneficial materials. Moreover, this configuration allows tailoring the configuration of the capsule to the substance and the beverage preparation method (e.g. setting pressures or preparation times, extracting/dissolving/infusing substances in a fluid), e.g. by choosing suitable biodegradable materials.

According to a preferred embodiment, the opening device and the capsule body may be made of biodegradable (and preferably compostable) materials with different physical properties, such as stiffness (i.e. the extent to which an object resists deformation in response to an applied force, e.g. resistance to a bend), strength, ductility, density, and/or elasticity. Preferably, the material used for the opening device may have a higher stiffness and/or rigidity than the material used for the capsule body. For example, the opening device may comprise (be made from) a relatively rigid material, such as solid or cured wood. The capsule body may comprise (be made from) a relatively flexible material, such as a pulp-based material, like pulp fibre cellulose, bagasse pulp, bamboo pulp, and/or wood pulp.

For example, by making the opening device mechanically stronger and/or more rigid than the capsule body (e.g. including the retaining wall), it is possible to supply the capsule with a self-opening mechanism that is suitable for opening the closed chamber while providing the capsule body in a relatively flexible material, such as a pulp-based material. Thus, by providing the opening device with a different tensile strength than the capsule body, the pressure built up inside the capsule can be controlled.

Preferably, the capsule may be made of wood pulp and wood parts. The term "pulp material" or "pulp" may refer to any material that comes from a (natural/plant-based) fibre source, such as lignocellulosic fibres, and that can be used as starting material for the process of moulding pulp fibre. Typically, moulded pulp fibre can be obtained through pulping or by chemically or mechanically separating cellulose fibres from plant material, like wood, bamboo, bagasse, fibre crops or wastepaper. Preferably, the capsule and/or the capsule body and/or the opening device may be made by (wet or dry) pulp moulding.

The term "wood" may be understood as parts, splints or splinters of wood in their original (natural and/or cohesive) constitution. The parts or splinters of wood may be chemically or physically processed, such as curing of wood. For example, the wooden parts may be treated such that the resistance to localized plastic deformation induced by either mechanical indentation or abrasion is increased.

According to a further preferred embodiment, the opening device may comprise at least one, preferably a plurality of, post element(s) for engagement with the retaining wall to open the closed chamber. Preferably, the post element may be made of a rigid material, such as solid or cured wood, injected wood, compostable resin and/or sharped paper. Preferably, the post element may be made of a material with a hardness that is at least (equal to, or greater than) 1.0 kg/mm2, more preferably of at least 1.8 kg/mm2.

Therein, hardness of a structure and/or of a material may be understood as its resistance to penetration of an indenter. Several tests exists for determining the hardness of a material, such as the Brinell test, which, for example, may be used in the present case. For example, the Brinell hardness number (BHN) expresses the relationship between a mechanical load acting on a surface divided by the actual area of the indentation. However, also other tests may be used to determine the hardness of the material.

Thus, the opening device (and/or its material) may be configured to resist to localized plastic deformation induced by either mechanical indentation or abrasion. Thereby, it is possible to provide the opening device with a structure that is tailored to its intended functionality of effecting an opening to the closed chamber. By providing numerous of such elements, also multiple openings to the chamber can be effected.

According to a preferred embodiment, the opening device may further comprise a supporting structure, by which the post element is at least partially embedded and/or enveloped. Preferably, the supporting structure may be made of a flexible material, such as pulp fibre cellulose, bagasse pulp, bamboo pulp, and/or wood pulp. More preferred, the supporting structure may be made integral with the capsule body (e.g.: the supporting structure may be part of the capsule body).

Thereby, it is possible to connect and attach the opening device to the capsule body and/or to make the opening device an integral part of the capsule body. In particular, with the above configuration, it is possible to integrate the opening device in the capsule body by merely embedding the post element(s) in a wall portion of the capsule body. Moreover, it is possible to provide the opening device with characteristics of a flexible and of a rigid material. For example, the post element can be provided from a (rigid) material that is particularly suitable for penetrating or resisting the retaining wall while the supporting structure can be made from a (flexible) material that provides a suitable attachment to the capsule body and dissipates tensions caused by the effect of rising pressure and/or by the engagement of the opening device with the retaining wall. Thereby, the opening device can be provided in a simple and particularly advantageous manner.

According to a preferred embodiment, the opening device (the post element), may form a recess and/or protrusion with respect to the retaining wall. Alternatively or additionally, the opening device (the post element) may have a cone-shape and/or a pyramid-shape. Preferably, at least a portion of the post element may protrude towards the retaining wall. The portion may protrude from the supporting structure towards the retaining wall. The portion may be arranged to penetrate and/or partially delaminate the retaining wall through the rise in pressure inside the closed chamber. For simplicity, the aforementioned portion may be called the "protruding portion" in the following. The post element or at least its protruding portion may taper towards the retaining wall, preferably so as to form a pointed and/or sharp-shaped tip, so as to puncture, tear, cut and/or break the retaining wall to open the closed chamber upon rise of the pressure.

Thereby, it is possible to provide the opening device with a defined configuration that allows to flex, stretch or break the retaining wall such that an opening to the closed chamber is created. For example, protrusions from the opening device may overcome the material resistance of the retaining wall under the effect of rising pressure and thereby, pierce the retaining wall. Also, it may be possible that the retaining wall separates, e.g. through lack of support from the opening device, from the capsule body such that delamination may be effected.

According to a preferred embodiment, the opening device may be an integral part of the capsule body. Therein, the opening device may be embedded within a portion of the capsule body. Alternatively or additionally, the supporting structure may be formed integrally with the capsule body.

By providing the capsule with an opening device that is integrated in the capsule body, it is, for example, possible to provide the opening device with sufficient stiffness for engaging with the retaining wall under the effect of pressure so that, for example, piercing of the retaining wall is achieved. Also, manufacturing can be simplified as the position of the opening device relative to the retaining wall can be accurately defined.

Therein, the expression "integral" may be understood, for example, as two elements being formed as unit and/or being composed as constituent parts that make up a (single) unit. For example, the opening device may be considered an integral part of the capsule body if the opening device cannot be removed from the capsule body without destruction of one of the two elements.

According to a preferred embodiment, at least part of the retaining wall and/or at least part of the opening device may be flexible so as to allow for relative movement with respect to each other to obtain engagement under the effect of pressure of the injected fluid rising in the closed chamber to open the closed chamber.

Thereby, it is possible to facilitate engagement between the retaining wall and opening device in a manner that uses the thrust generated by the pressure in the closed chamber in an advantageous manner. Moreover, the control of the opening mechanism can be controlled accurately with such configuration.

According to a further preferred embodiment, the retaining wall may be a film or membrane. The retaining wall may be made of a compostable and/or flexible material. The thickness of the retaining wall may be configured such that it is ruptured, torn and/or broken by engagement with the opening device once a (predetermined) pressure is exceeded in the closed chamber during the injection of the fluid.

Thereby, it is possible to define the characteristics of the retaining wall in relation to the opening device. For example, depending on the material and/or thickness of the film/membrane, the retaining wall may be opened at a defined pressure. Thereby, the course of the self-opening process can be defined more precisely. Hence, the beverage preparation process and beverage quality can be improved. Also, it is possible to define the retaining wall such that with exceeding a defined pressure inside the closed chamber the retaining wall bursts open in case of a malfunction of the self-opening mechanism (in which, for example, too much pressure is built up in the closed chamber before the self-opening mechanism is activated).

According to a preferred embodiment, the capsule body may have a continuous sidewall for delimiting the closed chamber. The capsule body may have at least one opening that is covered and closed by the retaining wall. Preferably, the capsule body may have a conical shape that is tapered towards one side. The opening device may be provided in a portion of the sidewall, by which preferably the capsule body is delimited on the one side. The capsule body may be made from a pulp-based material, such as pulp fibre cellulose, bagasse pulp, bamboo pulp, and/or wood pulp.

According to a further preferred embodiment, the capsule body may comprise an injection wall that is made of a biodegradable, preferably also compostable, material. The injection wall may delimit part of the closed chamber and/or may be configured to allow insertion of an injection device to inject the fluid. Therein, the injection wall may cover and close an injection opening of the capsule body. The injection opening may be defined by the continuous sidewall. The injection wall may be a film or membrane that may comprise a (bidirectional) barrier against oxygen and/or moisture.

Thereby, the closed chamber can be provided in a simple and secure manner. Moreover, the closed chamber can be provided such that fluid can be injected and the pressure can rise sufficiently for engagement between the opening device and the retaining wall.

According to a preferred embodiment, the capsule body may comprise a preferably bidirectional barrier layer for blocking gases, such as oxygen, and/or moisture from entering and/or leaving the closed chamber. The barrier layer may be provided as a liner and/or as a coating on at least portions of an inside surface of the capsule body, which faces the closed chamber. Preferably, the barrier layer may be a compostable polymer or a mix of compostable polymers, such as Polylactic acid (PLA), Polyhydroxyalkanoate (PHA), Polybutylene succinate (PBS), Poly(butylene succinate-co-butylene adipate) (PBSa), Poly(vinyl alcohol) (PVOH), Poly(glycolic acid) (PGA), regenerated cellophane, talc, and/or starch or compounds of such.

Thereby, the shelf-life of the capsule can be improved while maintaining the biodegradability (and compostability) of the capsule. Moreover, it can be achieved that the taste of the beverage is not altered by the capsule body material and that the capsule body is not soaked during the beverage preparation process.

According to a further preferred embodiment, the capsule may comprise a discharge portion for dispensing the prepared beverage out of the capsule. The discharge portion may be fluidly connected with the chamber after engagement between the retaining wall and the opening device was performed. The discharge portion may be an integral part of at least a portion of the capsule body. For example, the discharge portion may be a paper tube or may be integrally formed with the capsule body. Also, it may be possible to provide the discharge portion such that it acts as an aerator for creating a foam or crema in the dispensed beverage.

Thereby, the flow characteristics of the prepared beverage leaving the capsule can be set so that the beverage can be dispensed with a defined speed in a defined directions.

A further aspect of the invention relates to a method for constructing and manufacturing a capsule according to the first aspect of the present invention. The method comprises the following steps:

At least a first part of the opening device (the at least one post element), which is made from a first biodegradable material, such as wood or cured wood is provided. The first part of the opening device (the at least one post element) is placed in a mould. Preferably, the first part of the opening device (the at least one post element) may be provided by cutting the opening device from a solid biodegradable material, like wood pieces or cured wood pieces.

A second biodegradable material, such as pulp fibre cellulose, bagasse pulp, bamboo pulp, and/or wood pulp, is pressed into the mould to form the opening device such that the first part of the opening device is at least partially over-moulded by the second biodegradable material. Therein, the first biodegradable material is different from the second biodegradable material. Preferably, the pulp material may be pressed into the mould such that the opening device is provided with a defined shape, like a pyramid-shape.

Moreover, a biodegradable pulp material, such as pulp fibre cellulose, bagasse pulp, bamboo pulp, and/or wood pulp, is pressed into the mould to form at least part of the capsule body such that the opening device becomes an integral part of the capsule body. Preferably, the steps of pressing the material into the mould to form the opening device and to form at least part of the capsule body may be carried out simultaneously and preferably with the same biodegradable pulp material.

Preferably, the discharge portion, made from a biodegradable material, may be placed in the mould and the pulp material may be pressed into the mould such that the discharge portion becomes (an integral part of) a unit with the capsule body.

The formed capsule body (and/or opening device) is dried. The retaining wall is formed along with the rest of the capsule body such that the closed chamber is formed by pulp moulding and/or by attaching a membrane or film as the retaining wall to the capsule body after drying thereof, e.g. with a biodegradable adhesive. Preferably, the barrier layer, made from a biodegradable material, may be added on a surface of the capsule body, e.g. by thermoforming. Preferably, the capsule body may be filled with the substance for the preparation of the beverage.

Thereby, it is possible to produce a capsule with a self-opening mechanism, whereby the capsule and each of its components inside is made entirely of biodegradable and/or compostable materials. Also, it is possible to integrate the self-opening mechanism in the capsule. Thus, it is possible to produce an ecologically beneficial capsule without having to abstain from any of the functionality formerly provided in such capsules.

BRIEF DESCRIPTION OF DRAWINGS

Further features, advantages and objects of the present invention will become apparent for the skilled person when reading the following detailed description of embodiments of the present invention and when taking in conjunction with the figures of the enclosed drawings. In case numerals have been omitted from a figure, e.g. for reasons of clarity, the corresponding features may still be present in the figure.

DETAILED DESCRIPTION

The Figures show different views of different embodiments of a capsule 100 for preparing a beverage according to the present invention. The capsule 100 may be suitable for preparing a beverage by injecting a fluid into the capsule 100. Preferably, the capsule 100 may be entirely (exclusively) made of a biodegradable (and preferably also compostable) material.

The capsule 100 comprises a capsule body 200. The capsule body 200 is made of a biodegradable, preferably also compostable, material. Preferably, the capsule body 200 may be made from pulp, such as pulp fibre cellulose, bagasse pulp, bamboo pulp, and/or wood pulp. However, this is only exemplary and not a complete enumeration.

Figure 1:
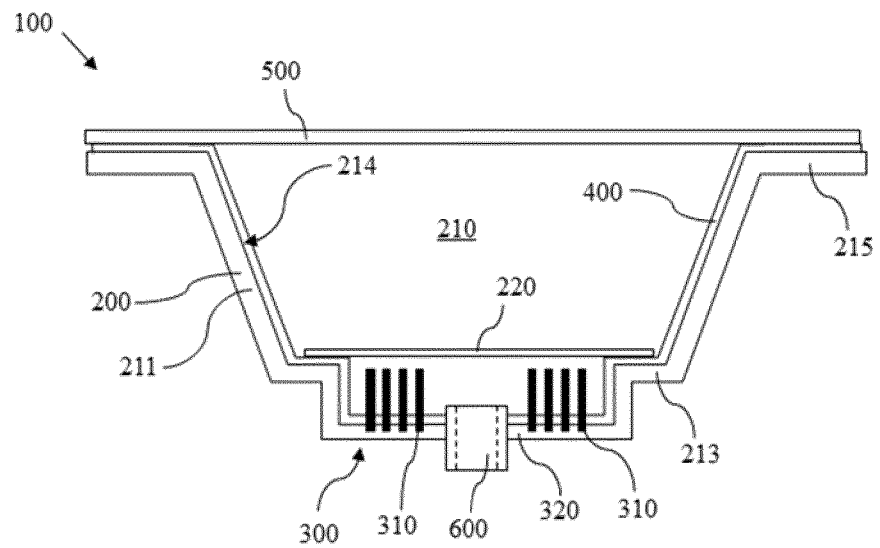
FIG. 1 shows a schematic view of a capsule according to a first embodiment of the invention.
Figure 2:
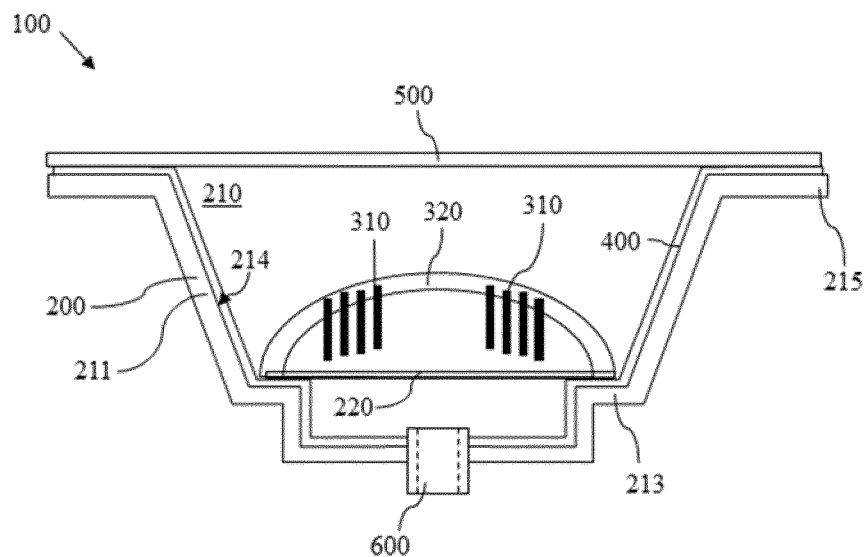
FIG. 2 shows a schematic view of a capsule according to a second embodiment of the invention.

The capsule body 200 may have any form or shape. For example, the capsule body 200 may have a ring or cup shape. FIGS. 1 and 2 illustrate the capsule body 200 exemplarily as having a conical shape that is tapered towards one side. The capsule body 200 may have a continuous sidewall 211. Preferably, the sidewall 211 may be circumferential, extend between two opposite sides and enclose a space inside the capsule body 200. The capsule body 200 may have at least one, preferably two openings for accessing the space inside the capsule body 200. The openings may be provided on each of the two opposite sides. The capsule body 200 may have a rim portion 215, which may be provided on a first side of the capsule body 200 and which may delimit one of the openings. The capsule body 200 also may comprise a shoulder portion 213, which may extend in the space surrounded by the capsule body.

The capsule body 200 delimits a closed chamber 210 for enclosing a substance used for the preparation of the beverage. For example, the sidewall 211 may form part of the chamber 210. This is exemplarily illustrated in FIGS. 1 and 2.

The capsule body 200 comprises a retaining wall 220, which further delimits a part of the chamber 210. The retaining wall 220 may be an integral or separate part of the capsule body 200. The capsule body 200 may have at least one opening that is covered and closed by the retaining wall 220. The retaining wall 220 may have any shape or form. For example, the retaining wall 220 may be a film or membrane, which preferably extends at least over the opening. The retaining wall 220 may be attached to the capsule body 200. For example, the retaining wall 220 may be attached to the shoulder portion 213 of the sidewall 211. This is exemplarily shown in FIGS. 1 and 2. For example, the retaining wall 220 may be attached by an adhesive layer to the shoulder portion 213. The thickness of the retaining wall 220 may be configured such that it is ruptured, torn and/or broken by exceeding a defined pressure in the closed chamber 210. The retaining wall 220 is made of a biodegradable, preferably also compostable and/or flexible, material.

For example, the retaining wall 220 may be a single layer (monolayer), such as a film or blend of Polylactic acid (PLA), Polyhydroxyalkanoate (PHA), Polybutylene succinate (PBS), Poly(butylene succinate-co-butylene adipate) (PBSa), Poly(vinyl alcohol) (PVOH), regenerated cellophane, talc, and/or starch. It is also conceivable that the retaining wall 220 may be provided as a layered/laminated structure. For example, the retaining wall 220 may be a layer of paper, such as parchment, supercalendered or standard, having a coating for sealing. Moreover, the retaining wall 220 may comprise two or more layers. For example, the retaining wall 220 may be a paper, such as parchment, supercalendered or standard, with an additional film, such as of PVOH, provided thereon. The retaining wall 220 may also be a paper, such as parchment, supercalendered or standard, with a layer of regenerated cellulose provided thereon. Alternatively or additionally, the retaining wall 220 may be a combination of two paper layers and a layer of PVOH, which may be provided between the two paper layers. However, it is also conceivable to have a first layer being provided from any one of the group of materials of PLA, PHA, PBS, PBSa, talc, starch, or families thereof. In addition, a second layer may be provided on the first layer, the second layer being made from PVOH. The second layer may be followed by a third layer, which may be made from any one of the group of materials of paper, PLA, PHA, PBS, PBSa, talc or starch. However, these are only examples for materials and combinations thereof that may be suitable for being used for the retaining wall 220 and thus, are not a complete enumeration.

The closed chamber 210 may be provided such that the pressure inside the chamber 210 can rise by injecting a fluid in the closed chamber 210. The closed chamber 210 may be suitable for receiving the substance. The closed chamber 210 may contain an inert gas (in addition to the substance) to increase the shelf-life of the capsule 100.

The capsule body 200 may further comprise a bidirectional barrier layer 400 for blocking gases, such as oxygen, or moisture from entering or leaving the closed chamber 210. The barrier layer 400 may be provided as a liner or a coating on an inside surface 214, which faces the closed chamber 210, or an outside facing surface of the capsule body 200. This is exemplarily illustrated in FIGS. 1 and 2. The barrier layer 400 may be of a biodegradable, preferably also compostable, material.

For example, the barrier layer 400 may be a compostable polymer or a mix of compostable polymers, such as Polylactic acid (PLA), Polyhydroxyalkanoate (PHA), Polybutylene succinate (PBS), Poly(butylene succinate-co-butylene adipate) (PBSa), Poly(vinyl alcohol) (PVOH), regenerated cellophane, talc, and/or starch. The barrier layer 400 may be provided in a layered/laminated manner. For example, the barrier layer 400 may be a single layer or multiple (different) layers. It is conceivable that a first layer may be one or a mix of different materials from the group of PLA, PHA, PBS, PBSa, talc, starch or PVOH. A second, consecutive layer may be made from PVOH. A third layer may be either one or a mix (blend) of the group of materials PLA, PHA, PBS, PBSa, talc, starch and/or PVOH. However, this is not a complete enumeration and further examples may be possible.

For example, the barrier layer 400 may be applied to the capsule body 200 by thermoforming. Furthermore, it is also conceivable that the retaining wall 220 may comprise the barrier layer 400 and/or an additional coating or lamination that effects sealing of the capsule 100.

The capsule body 200 may further comprise an injection wall 500 that delimits part of the closed chamber 210. Therein, the injection wall 500 may have any shape or form. For example, in FIGS. 1 and 2, the injection wall 500 is illustrated as a film or membrane. Preferably, the injection wall 500 is sealingly attached to the capsule body 200, for example on the rim portion 215. However, this is not delimiting and the injection wall 500 may have a different structure and being attached differently. For example, the injection wall 500 may be part of the capsule body 200. Therein, the injection wall 500 and the capsule body may be formed as two half-shells that may be welded together. The injection wall 500 may be configured to allow insertion by a fluid delivering injection device, e.g. an injection device of a beverage preparation machine, to inject the fluid. The injection wall 500 may cover and close an injection opening of the capsule body 200, which is defined by the continuous sidewall 211.

For example, the injection wall 500 may be a film or membrane that is made of a biodegradable, preferably also compostable, material. The material of the injection wall 500 preferably may comprise a (bidirectional) barrier against oxygen and/or moisture. In particular, the injection wall 500 may be made from the same materials and/or material combinations as described already above for the bottom membrane 220. For example, the injection wall 500 may have different layers that may be formed from any of the materials PVOH, paper, PLA, PHA, PBS, PBSa, talc and/or starch. However, it is also conceivable that the injection wall may be provided as a single layer from one of the group of PVOH, paper, PLA, PHA, PBS, PBSa, talc or starch.

The capsule 100 further comprises an opening device 300 for opening the closed chamber 210. The opening device 300 is made of a biodegradable, preferably also compostable, material. The opening device 300 is exemplarily shown in FIGS. 1 to 4.

The opening device 300 may be configured such that it forms a recess and/or protrusion with respect to the retaining wall 220. For example, the opening device 300 may have a cone-shape and/or a pyramid-shape, which may form protrusions and recesses against a surface of the retaining wall 220 facing the opening device 300. This is exemplarily illustrated in FIGS. 1 to 4.

Therein, the opening device 300 may comprise at least one or more post elements 310 for engagement with the retaining wall 220 to open the closed chamber 210. The post elements 310 are exemplarily illustrated in the FIGS. 1 to 4. The post element 310 may at least comprise or be made of a rigid material, such as solid or cured wood, injected wood, compostable resin and/or sharped paper. The post element 310 is made of a material with a hardness that is at least (equal to, or greater than) 1.0 kg/mm2 and more preferably at least 1.8 kg/mm2. For example, the opening device 300 may be provided with individual wooden spikes that may form a multitude of pyramid-shaped post elements 310. Alternatively or additionally, the post elements 310 may be integral with each other, such as exemplarily shown in FIG. 4. For example, the opening device 300 may be provided as a pyramid plate (i.e. a disk with a plurality of pyramid-shaped post elements 310). The post element 310 may taper towards the retaining wall 220 so as to form a pointed and/or sharp-shaped tip to puncture, tear, cut and/or break the retaining wall 220 for opening the closed chamber 210 upon rise of the pressure. This is exemplarily shown in FIGS. 3 and 4. Thus, with this configuration, the post element 310 may provide the piercing or cutting functionality of a spike, knife, blade, and/or lance.

The opening device 300 may comprise a supporting structure 320, by which the post element 310 may be at least partially embedded and/or enveloped. The supporting structure 320 may be made of a flexible material, like wood pulp, and/or of the same material(s) used for the capsule body 200.

Figure 3:
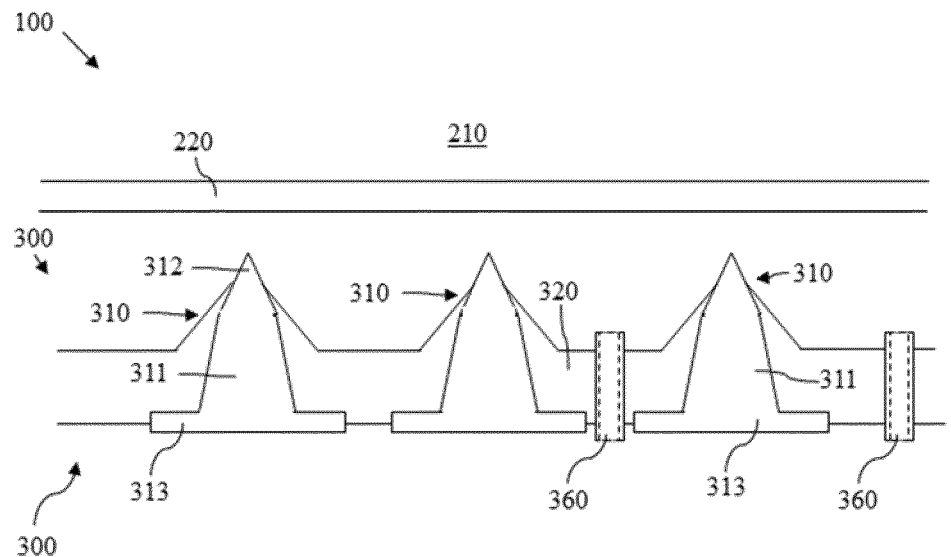
FIG. 3 shows a schematic view of an amplified cross-section of the opening device according to a first embodiment of the invention.
Figure 4:
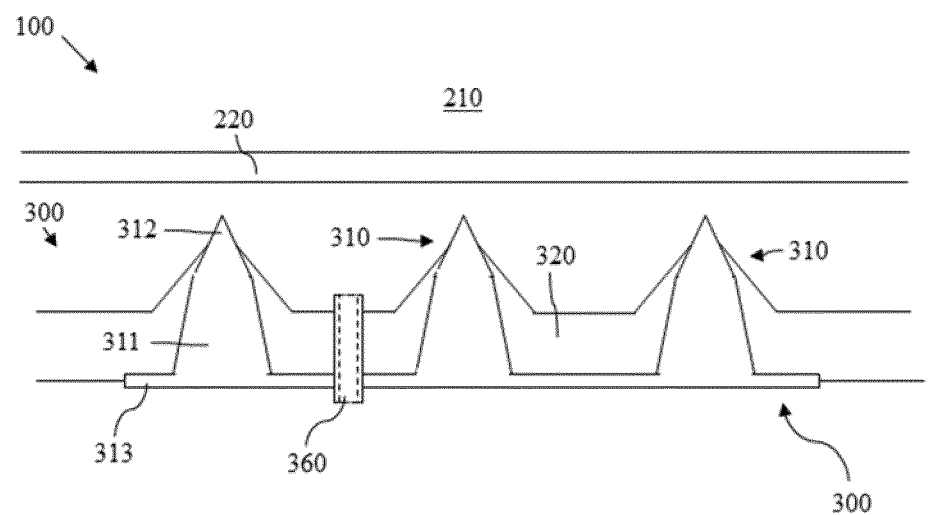
FIG. 4 shows a schematic view of an amplified cross-section of the opening device according to a second embodiment of the invention.

The supporting structure 320 may be a wall portion of the capsule body 320 so that the opening device 300 may be embedded within a portion of the capsule body 200 as shown exemplarily in FIGS. 1, 3 and 4. Therein, the opening device 300 may be an integral part of the capsule body 200 as the supporting structure 320 forms part of the capsule body 200. However, it is also conceivable that the opening device 300 may comprise the supporting structure 320 as a separate part from the capsule body 200, which may be glued to the capsule body 200. This is exemplarily shown in FIG. 2.

At least a portion of the post element 310 may protrude towards the retaining wall 220 as the post element's 310 protruding portion 312. This is exemplarily shown in FIGS. 3 and 4. Preferably, the protruding portion 312 may protrude from the supporting structure 320 towards the retaining wall 220 and may be arranged to penetrate and/or partially delaminate the retaining wall 220 through the rise in pressure inside the closed chamber 210. The protruding portion 312 may project uncovered from the supporting structure 320 and be tapered to form a pointed and/or sharp-shaped tip to puncture, tear, cut and/or break the retaining wall 220. The post element 310 may further comprise a root portion 313 for attaching to the supporting structure 320.

The opening device 300 and the capsule body 200 may be made of biodegradable materials with different physical properties, such as hardness, stiffness, strength, ductility, density, and/or elasticity. This is exemplarily indicated in FIGS. 1 and 2 by colouring components of the opening device 300 (unlike the capsule body 200) in black. For example, the opening device 300 may comprise a relatively rigid or hard material, such as solid or cured wood. In comparison, the capsule body 200 may comprise a relatively soft or flexible material, such as a pulp-based material, like wood pulp. Therein, the material used for the opening device 300 may have a higher stiffness than the material used for the capsule body 200. Alternatively or additionally, the material used for the opening device 300 has a higher hardness (e.g. measured in a Brinell test) than the material used for the capsule body 200.

Thus, the material used for the post element 310 may be a rigid or hard material, such as wood or cured wood, injected wood, compostable resin and/or sharped paper, compared to the material used for the supporting structure 320, which may be a flexible or soft material in comparison thereto, such as a pulp-based material, like such as pulp fibre cellulose, bagasse pulp, bamboo pulp, and/or wood pulp.

FIGS. 3 and 4 illustrate an exemplary configuration of the opening device 300. Therein, the opening device 300 (the post element 310) may have a composite structure, which comprises at least two components. The components may form one unit as exemplarily illustrated. Therein, a first component may be formed by the post element 310. A second component that at least partially envelops the first component may be formed by the supporting structure 320.

The opening device 300 and the retaining wall 220 are provided with respect to each other such that engagement between the retaining wall 220 and the opening device 300 is performed under the effect of pressure of the injected fluid rising in the closed chamber 210 to open the closed chamber 210. FIGS. 1 to 4 illustrate examples for such configurations. However, these are not to be understood as limiting the invention. Instead, additional configurations are conceivable providing the desired functionality.

At least part of the retaining wall 220 or at least part of the opening device 300 may be provided flexible so as to allow for relative movement with respect to each other to obtain engagement under the effect of pressure of the injected fluid rising in the closed chamber 210 to open the closed chamber 210. Alternatively or additionally, both of the opening device 300 and the retaining wall 220 may be provided flexible with respect to each other. For example, FIGS. 1, 3 and 4 illustrate exemplarily a configuration of the capsule 100, where the retaining wall 220 may be provided flexible to the opening device 300. In comparison, FIG. 2 illustrates an example for a configuration of the capsule 100, where the opening device 300 may be provided flexible to the retaining wall 220. For example, the supporting structure 320 may be provided as a flexible member that is pushed towards the retaining wall 220 under the effect of pressure rising in the closed chamber 210.

In this example, the supporting structure 320 may be provided as a flexible member and—during beverage preparation—may be pushed towards the retaining wall 220 under the effect of pressure of the injected fluid rising in the closed chamber 210. Thereby, the supporting structure 320 may act as a mechanical lever. Upon engagement between the retaining wall 220 and the, for example, blade-like shaped protruding portion 312 of the post element 310, the retaining wall 220 may be pierced so that an opening in the retaining wall 220 is created.

The thickness of the retaining wall 220 may be configured such that it is ruptured, torn and/or broken by engagement with the opening device 300 once a preferably predetermined pressure is exceeded in the closed chamber 210 during the injection of the fluid. For example, it may be necessary to build up a defined pressure difference inside the closed chamber 210 to provide sufficient force for performing the engagement between the opening device 300 and the retaining wall 220.

FIGS. 1 and 2 further illustrate exemplarily that the opening device 300 may be provided inside or outside of the closed chamber 210. It is also conceivable that the opening device 300 is provided in a portion of the sidewall 211 lateral from the retaining wall 220. Moreover, the opening device 300 may be provided on a portion of the capsule body 200 such that the opening device 300 delimits the capsule body 200 on one side.

The capsule 100 may further comprise a discharge portion 600 for dispensing the prepared beverage out of the capsule 100. Therein, the discharge portion 600 may fluidly be connected with the chamber 210 once the retaining wall 220 is opened through (successfully completed) engagement between the retaining wall 220 and the opening device 300. The discharge portion 600 may have a filtering function. The discharge portion 600 may be an integral part of at least a portion of the capsule body 200. The discharge portion 600 may be of a biodegradable, preferably also compostable, material. For example, the discharge portion 600 may be a paper tube. Alternatively or additionally, it is also conceivable that the opening device 300 may comprise at least one outlet opening 360 for directing the prepared beverage from the chamber 210 to the outside of the capsule 100. This is exemplarily illustrated in FIGS. 3 and 4. The outlet opening 360 and/or the discharge portion 600 may comprise a filter. The outlet opening 360 may have a filter function, e.g. for filtering out insoluble residues of the substance.

A further aspect of the invention relates to a system for preparing a beverage. The system is not illustrated in the Figures. The system comprises the capsule 100 with the features described above. The system further comprises a beverage preparation machine for preparing and dispensing the beverage from the capsule 100. The beverage preparation machine comprises a capsule opening for receiving the capsule 100, an injection device for injecting a fluid into the capsule 100, a pressure device for delivering the fluid to the injection device with a preferably defined pressure, and a discharge opening for dispensing the prepared beverage.

A further aspect of the invention relates to a process for preparing a beverage. The process comprises the step of providing the system for preparing a beverage as described above. Then, the capsule 100 is placed into the beverage preparation machine, for example into the capsule opening. Preferably, the injection device may be operated such that injection wall 500 is pierced by a nozzle of the injection device. Subsequently, the beverage preparation machine is operated such that a fluid is injected in the capsule 100 under pressure so that the retaining wall 220 and the opening device 300 engage with each other to open the capsule 100 once the pressure inside the capsule 100 reaches a predetermined level. Then the prepared beverage is dispensed from the capsule 100. This may also illustrate the use of the capsule 100 for preparing a beverage, which may form an additional aspect of the present invention.

A further aspect of the invention relates to a method for constructing and manufacturing the above-described capsule 100. An exemplary process is described in the following:

The at least one post element 310, which is made from a first biodegradable material, such as wood or cured wood, may be provided and placed in a mould. Then, a second biodegradable material, such as pulp fibre cellulose, bagasse pulp, bamboo pulp, and/or wood pulp, may be pressed into the mould to form the opening device 300 such that the at least one post element 310 is at least partially over-moulded by the second biodegradable material and the capsule body 200 is formed simultaneously. Therein, the second biodegradable material may be different from the first biodegradable material. The opening device 300 may become an integral part of the capsule body 200. Then, the so formed capsule 100 comprising at least the capsule body 200 and the opening device 300 may be dried. Afterwards, the retaining wall 220 may be formed along with the rest of the capsule body 200 such that the closed chamber 210 is formed by either pulp moulding or attaching, e.g. with a biodegradable adhesive, a membrane or film as the retaining wall 220 to the capsule body 200.

Preferably, the at least one post element 310 may be provided by cutting the opening device 300 from a solid biodegradable material, like wood pieces or cured wood pieces. Preferably, the post elements 310 may have a defined shape, like a pyramid-shape. Alternatively, the post elements 310 may be provided as injected wood, compostable resin and/or sharped paper in the mould. Moreover, the discharge portion 600, made from a biodegradable material, may be placed in the beginning in the mould and the pulp material may be pressed into the mould such that the discharge portion 600 becomes an integral part of the capsule body 200, whereby this step may be done simultaneously with the step of forming the opening device 300 and/or the capsule body 200. The barrier layer 400, made from a biodegradable material, may be added on a surface 214 of the capsule body 200, e.g. by thermoforming. Then, the capsule body 200 may be filled with the substance for the preparation of the beverage.

The invention is not limited by the embodiments as described hereinabove, as long as being covered by the appended claims. All the features of the embodiments described hereinabove can be combined in any possible way and be provided interchangeably. For example, the above-described order of the steps of the manufacturing process for the capsule 100 may be changed arbitrarily.

The invention claimed is:

1. A capsule for preparing a beverage, the capsule comprising
a capsule body delimiting a closed chamber for enclosing a substance for a preparation of the beverage by injecting a fluid into the closed chamber, wherein the capsule body comprises a retaining wall delimiting a part of the closed chamber, and
an opening device for opening the closed chamber,
the opening device and the retaining wall are provided with respect to each other such that engagement between the retaining wall and the opening device is performed under an effect of pressure of the fluid rising in the closed chamber to open the closed chamber, and
the capsule body with a retaining wall as well as the opening device are all made of a biodegradable material,
wherein the opening device and the capsule body are made of biodegradable materials with different physical properties,
wherein the opening device comprises a relatively rigid material made of solid or cured wood, and the capsule body comprises a relatively flexible material made of pulp-based material and the relatively rigid material used for the opening device has a higher stiffness than the relatively flexible material used for the capsule body.

2. The capsule according to claim 1, wherein the opening device comprises at least one post element for engagement with the retaining wall to open the closed chamber.

3. The capsule according to claim 2, wherein the post element tapers towards the retaining wall so as to puncture, tear, cut and/or break the retaining wall to open the closed chamber upon rise of the pressure of the injected fluid.

4. The capsule according to claim 1, wherein the opening device forms a recess and protrusion with respect to the retaining wall.

5. The capsule according to claim 1, wherein the opening device is an integral part of the capsule body.

6. The capsule according to claim 1, wherein at least part of the retaining wall and at least part of the opening device is flexible so as to allow for a relative movement with respect to each other to obtain engagement under the effect of the pressure of the injected fluid rising in the closed chamber to open the closed chamber.

7. The capsule according to claim 1, wherein the retaining wall is a film or membrane and wherein a thickness of the retaining wall is configured such that it is ruptured, torn and/or broken by engagement with the opening device.

8. The capsule according to claim 1, wherein the capsule body has a continuous sidewall for delimiting the closed chamber, the capsule body having at least one opening that is covered and closed by the retaining wall.

9. The capsule according to claim 1, wherein the capsule body comprises an injection wall made of a biodegradable material that delimits part of the closed chamber and that is configured to allow insertion of an injection device to inject the injected fluid.

10. The capsule according to claim 1, wherein the capsule body comprises a bidirectional barrier layer for blocking gases.

11. The capsule according to claim 1, wherein the capsule comprises a discharge portion for dispensing a prepared beverage out of the capsule.

12. A method for constructing and manufacturing a capsule, the method comprising the following steps:
providing at least a first part of an opening device which is made from a first biodegradable material;
placing the first part of the opening device in a mould;
pressing a second biodegradable material into the mould to form the opening device such that the first part of the opening device is at least partially over-moulded by the second biodegradable material, wherein the first biodegradable material is different from the second biodegradable material;
pressing a biodegradable pulp material into the mould to form at least part of the capsule body such that the opening device becomes an integral part of a formed capsule body;
drying the formed capsule body; and
forming a retaining wall along with the rest of the formed capsule body such that the closed chamber is formed by pulp moulding, and
attaching a membrane or film as the retaining wall to the formed capsule body after drying thereof.

13. The method according to claim 12, wherein the first part of the opening device is provided by cutting the opening device from a solid biodegradable material, and
wherein the steps of pressing the material into the mould to form the opening device and to form at least part of the capsule body are carried out simultaneously with the same biodegradable pulp material.

14. The method according to claim 12, further comprising at least one of the following steps:
pressing the pulp material into the mould such that the opening device is provided with a defined shape;
placing a discharge portion, made from a biodegradable material, in the mould and pressing the pulp material into the mould such that the discharge portion becomes an integral part of the formed capsule body;
adding a barrier layer, made from a biodegradable material, on a surface of the formed capsule body; and
filling the formed capsule body with a substance for the preparation of a beverage.

* * * * *